(12) United States Patent
Zhou et al.

(10) Patent No.: US 9,239,808 B2
(45) Date of Patent: Jan. 19, 2016

(54) SERIAL INTERFACE FOR FPGA PROTOTYPING

(71) Applicant: Marvell World Trade Ltd., St. Michael (BB)

(72) Inventors: Wei Zhou, San Jose, CA (US); Chee Hoe Chu, San Jose, CA (US); Po-Chien Chang, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 187 days.

(21) Appl. No.: 13/712,183

(22) Filed: Dec. 12, 2012

(65) Prior Publication Data

US 2013/0159595 A1     Jun. 20, 2013

Related U.S. Application Data

(60) Provisional application No. 61/576,310, filed on Dec. 15, 2011.

(51) Int. Cl.
| | |
|---|---|
| *G06F 13/00* | (2006.01) |
| *G06F 13/12* | (2006.01) |
| *G06F 13/38* | (2006.01) |
| *G06F 13/36* | (2006.01) |
| *G06F 13/40* | (2006.01) |

(52) U.S. Cl.
CPC ........ *G06F 13/4022* (2013.01); *G06F 13/4027* (2013.01)

(58) Field of Classification Search
USPC ........................................... 710/317, 315, 71
See application file for complete search history.

(56) References Cited

U.S. PATENT DOCUMENTS

| | | | |
|---|---|---|---|
| 5,761,484 A | 6/1998 | Agarwal et al. | |
| 7,086,025 B1 | 8/2006 | Yang | |
| 7,783,819 B2 * | 8/2010 | Mandhani | G06F 13/404 710/105 |
| 8,489,794 B2 * | 7/2013 | Byrne | G06F 13/4059 710/110 |

(Continued)

FOREIGN PATENT DOCUMENTS

| | | |
|---|---|---|
| GB | 2466821 | 7/2010 |
| WO | WO-2013090589 | 6/2013 |

OTHER PUBLICATIONS

"LogiCORE IP PLBV46 to AXI Bridge Product Specification", Jun. 22, 2011, Xilinix, v. 2.00a, pp. 3-7 and 34.*

(Continued)

*Primary Examiner* — Faisal M Zaman

(57) ABSTRACT

In aspects of serial interface for FPGA prototyping, an advanced crossbar interconnect (AXI) bridge structure enables serial data communication between field programmable gate arrays (FPGA) in a system-on-chip (SoC). The AXI bridge structure includes a parallel interface configured to receive AXI data signals from an AXI component implemented at a first FPGA. A transmit (TX) engine is configured to packetize the AXI data signals into an AXI data packet, and transmit the AXI data packet to a second FPGA via a serial link. The AXI bridge structure also includes a receive (RX) engine configured to receive an additional AXI data packet from the second FPGA via the serial link, and extract AXI data signals from the additional AXI data packet. The parallel interface is further configured to provide the additional AXI data signals to the AXI component.

20 Claims, 11 Drawing Sheets

(56) References Cited

U.S. PATENT DOCUMENTS

| | | | | |
|---|---|---|---|---|
| 8,504,756 | B2* | 8/2013 | Kothamasu | G06F 13/4027 710/306 |
| 8,838,869 | B1* | 9/2014 | Puranik | G06F 13/387 710/312 |
| 8,930,602 | B2* | 1/2015 | Lim | G06F 13/14 710/107 |
| 9,053,251 | B2* | 6/2015 | Adler | G06F 13/366 1/1 |
| 2003/0099260 | A1* | 5/2003 | Bunton | 370/535 |
| 2004/0225805 | A1* | 11/2004 | Vasudevan | 710/305 |
| 2007/0067549 | A1* | 3/2007 | Gehman | H04L 12/4625 710/315 |
| 2009/0182919 | A1* | 7/2009 | Chang et al. | 710/106 |
| 2011/0055666 | A1* | 3/2011 | Hedaoo et al. | 714/776 |
| 2011/0251836 | A1* | 10/2011 | Wang | G06F 11/3652 703/28 |
| 2011/0289179 | A1* | 11/2011 | Pekcan | H04L 49/65 709/213 |
| 2012/0159037 | A1* | 6/2012 | Kwon et al. | 710/317 |
| 2013/0077635 | A1* | 3/2013 | Deivasigamani | G06F 13/4045 370/402 |

OTHER PUBLICATIONS

"PCT Search Report and Written Opinion", Application No. PCT/US2012/069526, Sep. 9, 2013, 8 Pages.

* cited by examiner

700

| SOF 702 |||||||
|---|---|---|---|---|---|---|
| AXI_READ 704 |||||||
| ARADDR[31:0] 706 |||||||
| RID[3:0] 708 | ARLEN 710 | ARSIZE 712 | ARBURST 714 | ARLOCK 716 | ARCACHE 718 | ARPROT 720 | RSVD 722 |
| CRC 724 |||||||
| EOF 726 |||||||

| SOF 802 |||||||
|---|---|---|---|---|---|---|
| AXI_WRITE 804 |||||||
| AWADDR[31:0] 806 |||||||
| WID[3:0] 808 | AWLEN 810 | AWSIZE 812 | AWBURST 814 | AWLOCK 816 | AWCACHE 818 | AWPROT 820 | RSVD 822 |
| WDATA 824 |||||||
| WSTROB0 826 | WSTROB1 828 | | | | | |
| CRC 830 |||||||
| EOF 832 |||||||

| SOF 902 |
| READ_COMPLETE 904 |
| | RID[3:0] 906 | RSTROB0 908 | RSTROB1 910 | |
| RDATA 912 |
| CRC 914 |
| EOF 916 |

| SOF 1002 |
| WRITE_RESPONSE 1004 |
| | BID[3:0] 1006 | BRESP 1008 | |
| CRC 1010 |
| EOF 1012 |

FIG. 10

SERIAL INTERFACE FOR FPGA PROTOTYPING

RELATED APPLICATION

This application claims priority to U.S. Provisional Patent Application Ser. No. 61/576,310 filed Dec. 15, 2011, the disclosure of which is incorporated by reference herein in its entirety.

BACKGROUND

The Background described in this section is included merely to present a general context of the disclosure. The Background description is not prior art to the claims in this application, and is not admitted to be prior art by inclusion in this section.

FPGA prototyping, also referred to as application specific integrated circuit (ASIC) prototyping or system-on-chip (SoC) prototyping, is used to prototype SoC and ASIC design on field programmable gate arrays (FPGA) for hardware verification and software development. When prototyping with FPGAs, the SoC is often partitioned into multiple FPGAs, where each FPGA may implement a specific component of the SoC. Conventional SoC's use a parallel interconnect structure to communicate data between components. This parallel interconnect structure requires multiple data lines and pins, making partitioning of the SoC difficult.

SUMMARY

This Summary introduces concepts of serial interface for FPGA prototyping, and the concepts are further described below in the Detailed Description and/or shown in the Figures. Accordingly, this Summary should not be considered to describe essential features nor used to limit the scope of the claimed subject matter.

In one aspect of serial interface for FPGA prototyping, an AXI bridge structure enables serial data communication between FPGAs in a system on chip. The AXI bridge structure includes a parallel interface configured to receive AXI data signals from an AXI component implemented at a first FPGA. The AXI bridge structure also includes a transmit (TX) engine configured to packetize the AXI data signals into an AXI data packet, and transmit the AXI data packet to a second FPGA via a serial link. The AXI bridge structure also includes a receive (RX) engine configured to receive an additional AXI data packet from the second FPGA via the serial link, and extract additional AXI data signals from the additional AXI data packet. The parallel interface is further configured to provide the additional AXI data signals to the AXI component.

In another aspect of serial interface for FPGA prototyping, a serial interface includes a first AXI bridge at a first FPGA. The first AXI bridge is configured to receive AXI data signals of a read or write request from a first AXI component via a first AXI parallel interface, packetize the AXI data signals into an AXI request packet, and transmit the AXI request packet to a second FPGA via a serial link. The serial interface further includes a second AXI bridge at the second FPGA. The second AXI bridge is configured to receive the AXI request packet via the serial link, extract the AXI data signals of the read or write request from the AXI request packet, and provide the AXI data signals of the read or write request to a second AXI component via a second AXI parallel interface.

A method implemented by an AXI bridge is described for performing a data read operation. The method includes receiving parallel AXI data signals corresponding to a data read request from an AXI component. The AXI data signals identify an address from which data is to be read. The method also includes packetizing the AXI data signals of the data read request into an AXI read packet and transmitting the AXI read packet via a serial link to a second FPGA. The method also includes receiving an AXI read complete packet from the second FPGA via the serial link, extracting the requested data from the AXI read complete packet, and providing the requested data to the AXI component.

Another method implemented by an AXI bridge is described for performing a data write operation. The method includes receiving parallel data signals corresponding to a data write request from an AXI component. The AXI data signals include write data and identify an address at which the write data is to be written. The method also includes packetizing the AXI data signals of the data write request into an AXI write packet, and transmitting the AXI write packet via the serial link to the second FPGA. The method also includes receiving an AXI write response packet from the second FPGA via the serial link. The AXI write response packet includes an identifier of whether or not the write data was successfully written. The method also includes extracting the identifier of whether or not the write data was successfully written from the AXI write response packet, and providing the identifier to the AXI component

BRIEF DESCRIPTION OF THE DRAWINGS

Details of serial interface for FPGA prototyping are described with reference to the following Figures. The same numbers may be used throughout to reference like features and components that are shown in the Figures:

FIG. 7 illustrates an example read packet in accordance with one or more aspects.

FIG. 8 illustrates an example write packet in accordance with one or more aspects.

FIG. 9 illustrates an example read complete packet in accordance with one or more aspects.

FIG. 10 illustrates an example write response packet in accordance with one or more aspects.

DETAILED DESCRIPTION

The parallel interconnect structure of a conventional SoC uses multiple data lines and pins to enable data communication between SoC components, which makes partitioning of the SoC difficult. In accordance with various aspects, a serial interface is described that replaces the parallel interconnect structure used in conventional FPGA prototyping designs. The serial interface can include a first AXI bridge at a first FPGA. The first AXI bridge is configured to receive AXI data signals of a read or write request from a first AXI component via a first AXI parallel interface, packetize the AXI data signals into an AXI request packet, and transmit the AXI request packet to a second FPGA via a serial link. The serial interface further includes a second AXI bridge at the second FPGA. The second AXI bridge is configured to receive the AXI request packet via the serial link, extract the AXI data signals of the read or write request from the AXI request packet, and provide the AXI data signals of the read or write request to a second AXI component via a second AXI parallel interface.

While features and concepts of serial interface for FPGA prototyping can be implemented in any number of different devices, systems, environments, and/or configurations, aspects of serial interface for FPGA prototyping are described in the context of the following example devices, systems, and methods.

Figure 1:
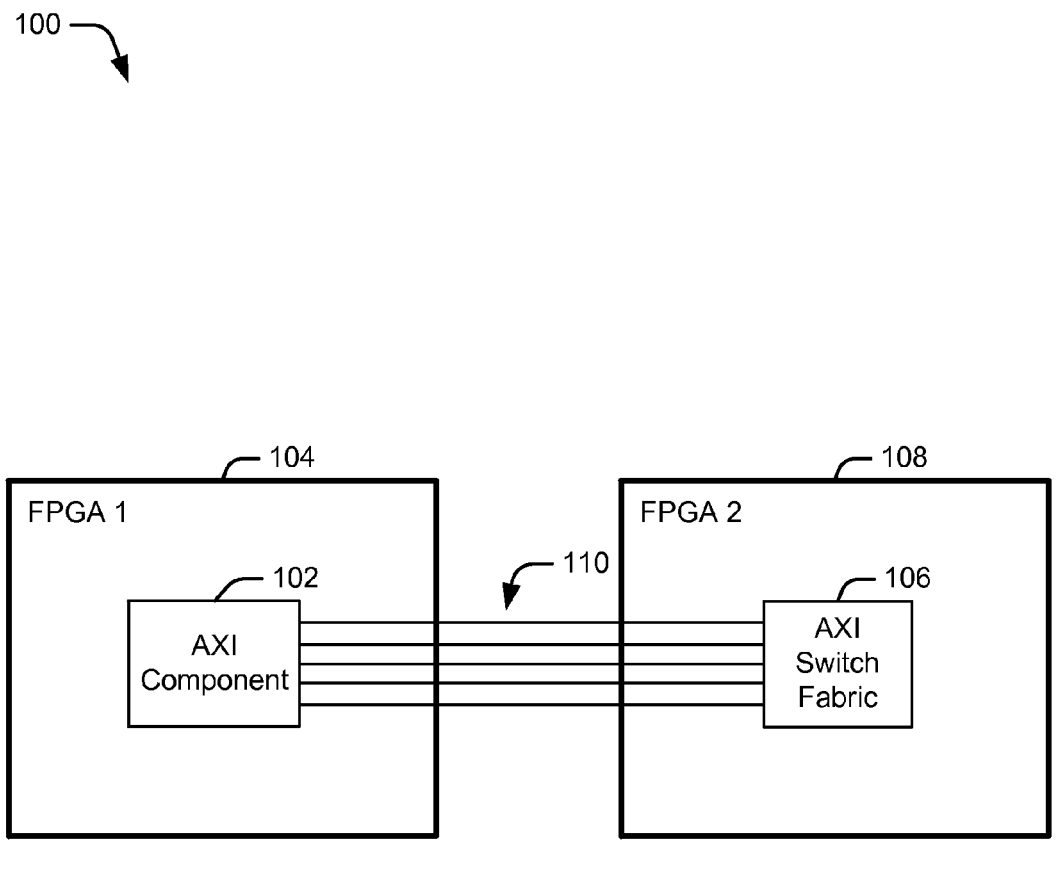
FIG. 1 illustrates an example of a conventional parallel interconnect structure configured to enable data communication between FPGAs on a system-on-chip.

FIG. 1 illustrates an example 100 of a conventional parallel interconnect structure configured to enable data communication between FPGAs on an SoC. In this example, the SoC is partitioned into an AXI component 102 on a first FPGA 104, and an AXI switch fabric 106 on a second FPGA 108. AXI component 102 and AXI switch fabric 106 are configured to communicate with each other by sending AXI data signals via an AXI parallel interface 110.

In example 100, AXI component 102 is configured to initiate data read operations by transmitting a read request to AXI switch fabric 106 via AXI parallel interface 110. In response to receiving the read request, AXI switch fabric 106 is configured to return a read response that includes data from an address identified in the request. AXI component 102 is also configured to initiate data write operations by transmitting a write request to AXI switch fabric 106 via AXI parallel interface 110. In response to receiving the write request, AXI switch fabric 106 is configured to write data to an address identified in the write request and to receive a write response that indicates whether the data was successfully written. To enable data read operations, AXI parallel interface 110 defines a read address channel for communicating read requests, and a read data channel for communicating the requested read data. To enable data write operations, AXI parallel interface 110 defines a write address channel for communicating write requests, a write data channel for communicating the requested write data, and a write response channel for communicating an indication of whether the write operation was successful.

Figure 2:
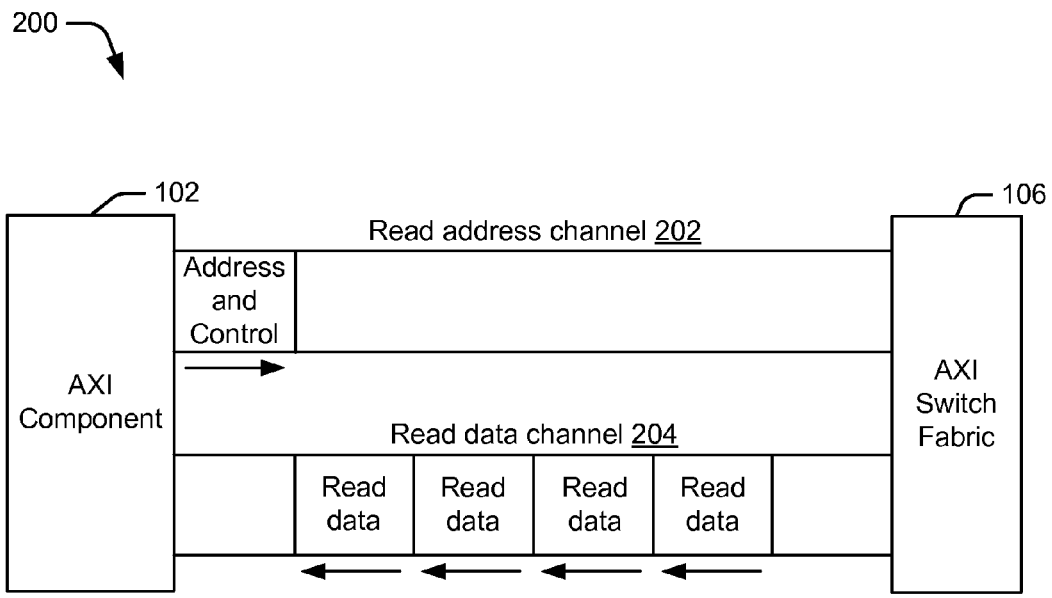
FIG. 2 illustrates an example read address channel and read data channel of the parallel interface defined by AXI.

FIG. 2 illustrates an example 200 of a read address channel 202 and a read data channel 204 of the parallel interface defined by AXI. Read address channel 202 enables AXI component 102 to transmit read requests to AXI switch fabric 106.

Each read request includes data signals that identify an address from which to read the requested data. Read data channel 204 enables AXI switch fabric 106 to transmit the requested read data back to AXI component 102.

Figure 3:
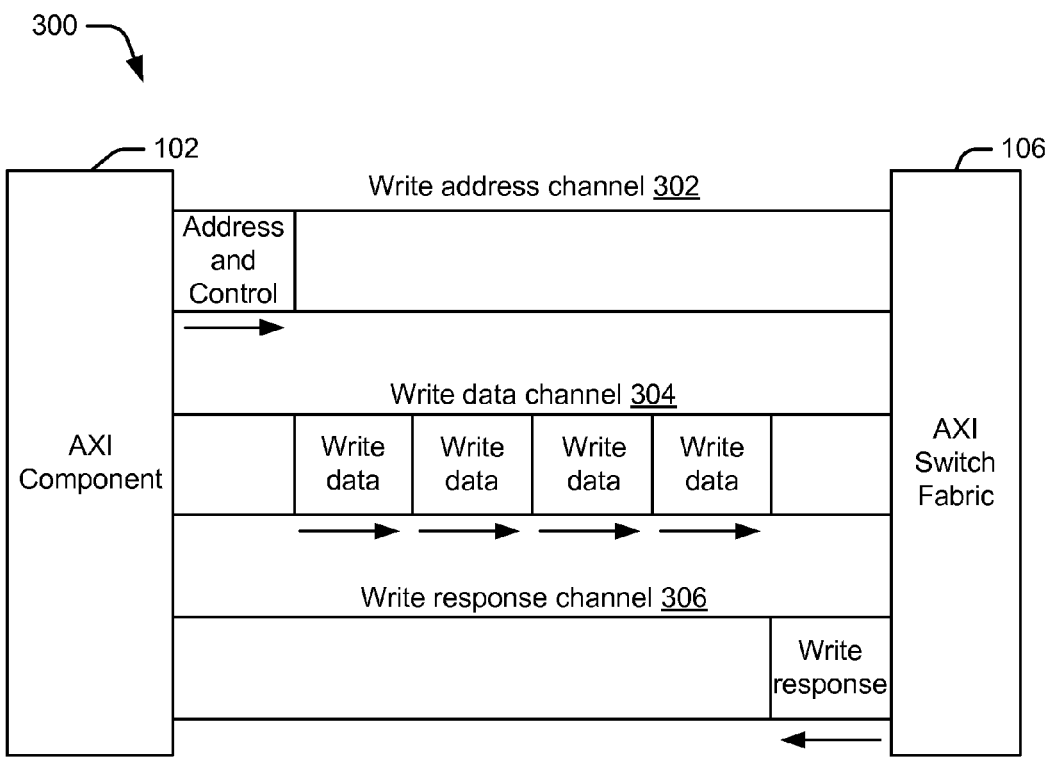
FIG. 3 illustrates an example write address channel, write data channel, and write response channel of the parallel interface defined by AXI.

FIG. 3 illustrates an example 300 of a write address channel 302, a write data channel 304, and a write response channel 306 of the parallel interface defined by AXI. Write address channel 302 enables AXI component 102 to transmit write requests to AXI switch fabric 106. The write requests can include data signals that identify an address at which to write the data. Write data channel 304 enables AXI component 102 to transmit the requested write data to AXI switch fabric 106. Write response channel 306 enables AXI switch fabric 106 to transmit a write response that indicates whether or not AXI switch fabric was able to write the requested data to the identified address.

Figure 4:
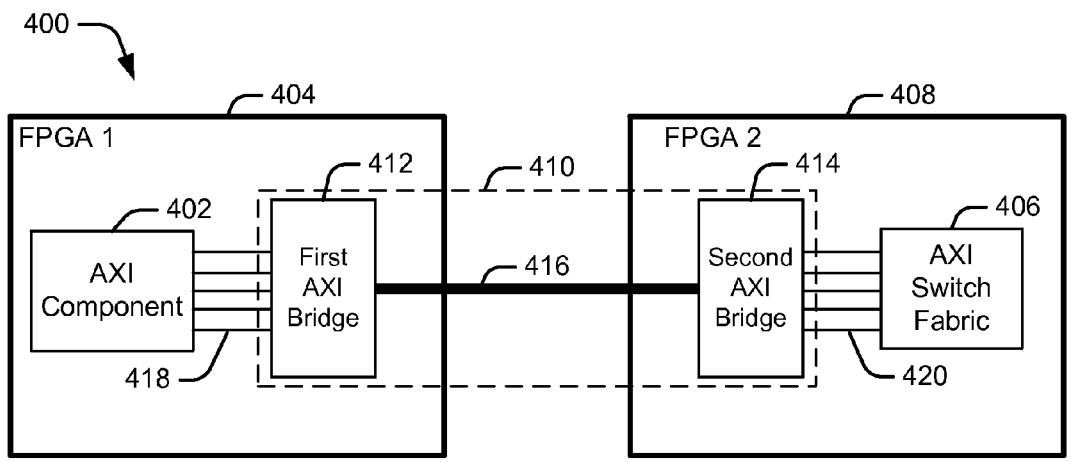
FIG. 4 illustrates an example system-on-chip environment in which aspects of serial interface for FPGA prototyping can be implemented.

FIG. 4 illustrates an example SoC environment 400 in which aspects of serial interface for FPGA prototyping can be implemented. Similar to example 100 of FIG. 1, a system-on-chip is partitioned into an AXI component 402 on a first FPGA 404, and an AXI switch fabric 406 on a second FPGA 408. Unlike example 100, however, example 400 includes an AXI serial interface 410 that enables serial data communication between SoC components. In this example, AXI serial interface 410 includes a first AXI bridge 412 at first FPGA 404, a second AXI bridge 414 at second FPGA 408, an AXI serial link 416 connecting first AXI bridge 412 to second AXI bridge 414, and parallel interfaces 418 and 420.

AXI bridges 412 and 414 are configured to receive parallel AXI data signals from AXI components. It is to be noted that these parallel AXI data signals are the same types of signals that, in conventional designs such as example 100, would be communicated directly between AXI components via the AXI parallel interface. In a sense, therefore, AXI bridges 412 and 414 are configured to "intercept" these parallel data signals.

As will be described in more detail below, AXI bridges 412 and 414 are configured to packetize or translate parallel AXI data signals received via parallel interface 418 or 420 into AXI data packets. These AXI data packets include all of the data of the received parallel AXI data signals. AXI bridges 412 and 414 can then communicate these data packets to each other via serial link 416. Similarly, AXI bridges 412 and 414 are configured to receive AXI data packets from each other via serial link 416. AXI bridges 412 and 414 can then extract the AXI data signals from the AXI data packets, and provide the AXI data signals to AXI component 402 and AXI switch fabric 406 via parallel interfaces 418 and 420. It is to be noted, therefore, that serial interface 410 eliminates the need for the AXI parallel interface to communicate data between FPGAs. Furthermore, serial link 416 greatly reduces the data line and pin count of the FPGA interconnect structure by using only two pins for each serial link between FPGA's, as opposed to parallel interface 110 which requires two pins for each data line of each parallel interface between FPGA's.

Figure 5:
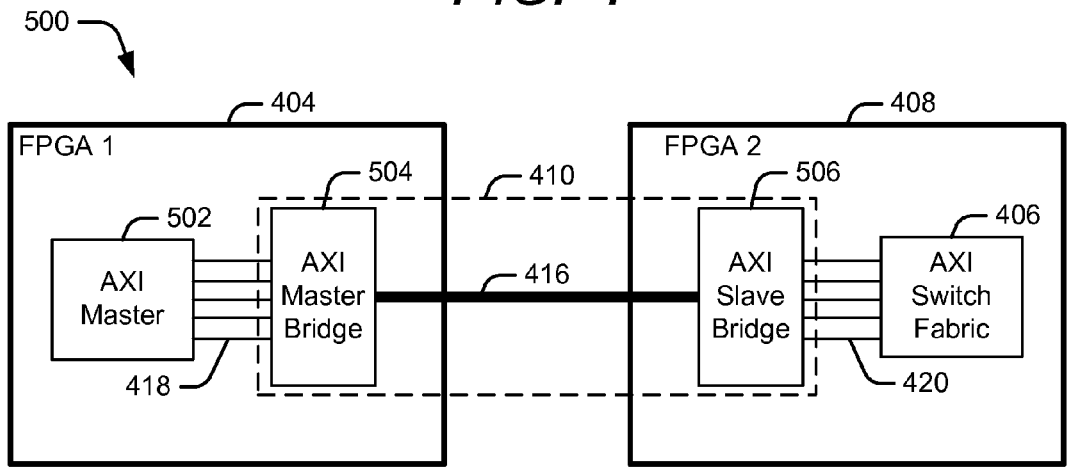
FIG. 5 illustrates a specific example system-on-chip environment in which aspects of serial interface for FPGA prototyping can be implemented.

FIG. 5 illustrates a specific example SoC environment 500 in which aspects of serial interface for FPGA prototyping can be implemented. In this example, AXI component 402 of FIG. 4 is implemented as an AXI master component 502 that is configured to transmit data read and write requests to AXI switch fabric 406. Additionally, first AXI bridge 412 is implemented, in this example, as an AXI master bridge 504 at first FPGA 404, and second AXI bridge 414 is implemented as an AXI slave bridge 506 at second FPGA 408.

Figure 6:
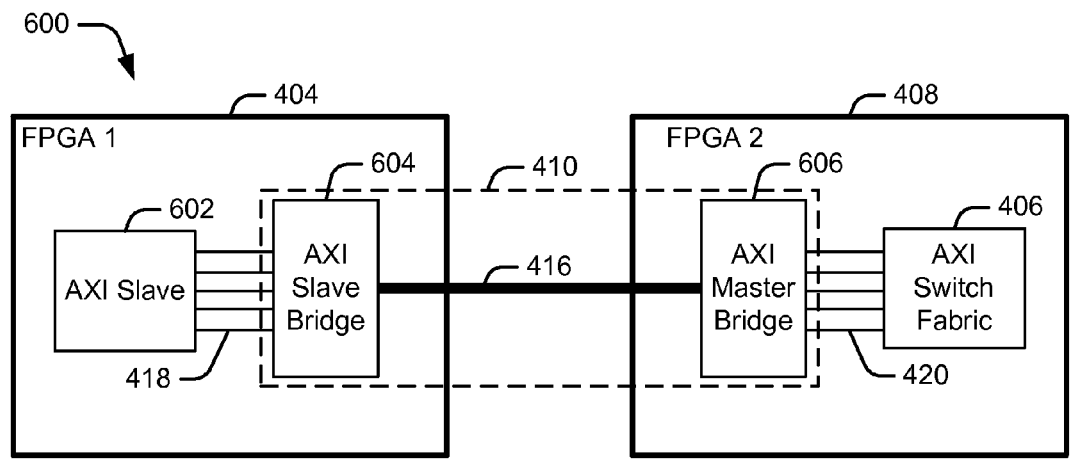
FIG. 6 illustrates an alternate specific example system-on-chip environment in which aspects of serial interface for FPGA prototyping can be implemented.

FIG. 6 illustrates an alternate specific example SoC environment 600 in which aspects of serial interface for FPGA prototyping can be implemented. In this example, AXI component 402 of FIG. 4 is implemented as an AXI slave component 602 that is configured to transmit data read and write requests to AXI switch fabric 406. Additionally, first AXI bridge 412 is implemented, in this example, as an AXI slave bridge 604 at first FPGA 404, and second AXI bridge 414 is implemented as an AXI master bridge 606 at second FPGA 408.

AXI component 402 is configured to initiate data read and write operations by issuing a data read or write request. A data read request is configured to cause AXI switch fabric 406 to return data from an address identified in the request, whereas a data write request is configured to cause AXI switch fabric 406 to write data included in the request to an address identified in the request. As noted above, in conventional designs, the data read and write requests are communicated directly to the AXI switch fabric via the AXI parallel interface.

In accordance with various aspects, when AXI component 402 issues a read or write request, first AXI bridge 412 is configured to receive parallel AXI data signals corresponding to the read or write request from AXI component 402 via parallel interface 418. It is to be noted that these AXI data signals are the same types of signals that, in conventional designs such as example 100, would be communicated directly to the AXI switch fabric via parallel interface 110. In a sense, therefore, first AXI bridge 412 is configured to "intercept" these AXI data signals. If the request is a data read request, the AXI data signals include address and control signals that are received via read address channel 202 of parallel interface 418. The address and control signals of the data read request include an identifier of an address from which to read the requested data. Alternately, if the request is a data write request, the AXI data signals include address and control signals that are received via write address channel 302 of parallel interface 418, and write data that is received via write response channel 306 of parallel interface 418. The address and control signals of the write request include an identifier of an address at which to write the data.

In accordance with various aspects, first AXI bridge 412 is configured to packetize or translate the AXI data signals corresponding to the read or write request into an AXI request packet. The AXI request packet includes all of the data signals that, in conventional designs, are communicated to the AXI switch fabric via read address channel 202 or write address channel 302 and write data channel 304 of the AXI parallel interface. For example, if the request is a read request, first AXI bridge 412 packetizes data signals received in the read request, as well as a packet header and footer, into a read packet. The read packet includes the identifier of an address from which to read data that is received via read address channel 202 of parallel interface 418. Alternately, if the request is a write request, first AXI bridge 412 packetizes data signals received in the write request, as well as a packet header and footer, into a write packet. The write packet includes write data received via write data channel 304 of parallel interface 418, as well as the identifier of the address at which to write the data received via write address channel 302 of parallel interface 418. After packetizing the AXI data signals into the AXI request packet, first AXI bridge 412 transmits the AXI request packet to second AXI bridge 414 via serial link 416.

FIG. 7 illustrates an example 700 of an AXI read packet in accordance with one or more aspects. In this non-limiting example, AXI read packet 700 includes data signals captured from read address channel 202 of the AXI parallel interface, a read packet header, and a read packet footer. The read packet header includes a start of frame (SOF) field 702 that indicates the start of the read packet, and an AXI read packet (AXI_READ) field 704 that indicates the packet is a read packet. AXI read packet 700 further includes a read address (ARADDR) field 706 that indicates the address from which the data is to be read. In this example, read address field 706 is 32 bits, and corresponds to the address signaling of the AXI parallel interface that is defined in AXI. AXI read packet 700 further includes a read identifier (RID) field 708, a read lens (ARLEN) field 710, a read size (ARSIZE) field 712, a read burst (ARBURST) field 714, a read lock (ARLOCK) field 716, a read cache (ARCACHE) field 718, a read protection (ARPROT) field 720, and a reserved (RSVD) field 722. Each of fields 706-722 correspond to data signals that are captured from read address channel 202 of the AXI parallel interface. It is to be noted that read address channel 202 would require a separate data line to communicate the data signals contained in each of data fields 706-722. In this example, AXI read packet 700 further includes a read packet footer, that includes a cyclic redundancy check field 724 that is configured to protect AXI read packet 700, and an end of frame (EOF) field 726 that indicates the end of AXI read packet 700.

FIG. 8 illustrates an example 800 of an AXI write packet in accordance with one or more aspects. In this non-limiting example, AXI write packet 800 includes data signals captured from write address channel 302 of the AXI parallel interface, a write packet header, and a write packet footer. The write packet header includes a start of frame (SOF) field 802 that indicates the start of the write packet, and an AXI write packet (AXI_WRITE) field 804 that indicates the packet is a write packet. AXI write packet 800 further includes a write address (AWADDR) field 806 that indicates the address at which the data is to be written. In this example, write address field 806 is 32 bits, and corresponds to the address signaling of the AXI parallel interface that is defined in AXI. AXI write packet 800 further includes a write identifier (WID) field 808, a write lens (AWLEN) field 810, a write size (AWSIZE) field 812, a write burst (AWBURST) field 814, a write lock (AWLOCK) field 816, a write cache (AWCACHE) field 818, a write protection (AWPROT) field 820, and a reserved (RSVD) field 822

AXI write packet 800 further includes a write data (WDATA) field 824 that includes the write data that is to be written to the address indicated by write address field 806. In addition, AXI write packet 800 includes a first write strobe (WSTROB0) field 826, and a second write strobe (WSTROB1) field 828. First write strobe field 826 indicates the beginning of the write data and second write strobe field 828 indicates the ending of the write data. Each of fields 806-828 correspond to the data signals that are captured from write address channel 302 or write data channel 304 of the AXI parallel interface. It is to be noted that write address channel 302 and write data channel 304 of the AXI parallel interface would require a separate data line to communicate the data signals contained in each of data fields 806-828. In this example, AXI write packet 800 further includes a write packet footer, that includes a cyclic redundancy check field 830 that is configured to protect AXI write packet 800, and an end of frame (EOF) field 832 that indicates the end of AXI write packet 800.

In accordance with various aspects, after receiving the AXI request packet from first AXI bridge 412 via serial link 416, second AXI bridge 414 is configured to extract the AXI data signals corresponding to the read or write request from the AXI request packet. For example, if the AXI request packet is an AXI read packet, second AXI bridge 414 extracts data signals from the AXI read packet, including the identifier of the address from which to read the requested data. Alternately, if the AXI request packet is an AXI write packet, second AXI bridge 414 extracts data signals from the AXI write packet, including the write data and the identifier of the address at which to write the data. Second AXI bridge 414 then provides the extracted AXI data signals corresponding to the read or write request to AXI switch fabric 406 via parallel interface 420.

AXI switch fabric 406 is configured to perform a data read or write operation based on the read or write request. If the request is a data read request, AXI switch fabric reads data from the address identified in the request. Alternately, if the request is a data write request, AXI switch fabric 406 writes the data received in the request to the address identified in the write request. After performing the read or write operation, AXI switch fabric 406 issues a data read or write response. As noted above, in conventional designs, the data read and write responses are communicated directly to AXI component 102 via the AXI parallel interface.

In accordance with one or more aspects, when AXI switch fabric 406 issues a read or write response, second AXI bridge 414 is configured to receive parallel AXI data signals corresponding to the read or write response from AXI switch fabric 406 via parallel interface 420. It is to be noted that these AXI data signals are the same types of signals that, in conventional designs such as example 100, would be communicated directly to the AXI component via the AXI parallel interface. In a sense, therefore, second AXI bridge 414 is configured to "intercept" these data signals. Thus, if the response is a data read response, the AXI data signals are received via read data channel 204 and include the requested read data. Alternately, if the response is a data write response, the AXI data signals are received via write response channel 306 and include write response data which indicates whether or not the write operation was completed successfully.

In accordance with one or more aspects, second AXI bridge 414 is configured to packetize or translate the AXI data signals corresponding to the read or write response into an AXI response packet. The AXI response packet includes all of the data signals that, in conventional designs, are communicated to the AXI component via read data channel 204 or write response channel 306 of the AXI parallel interface. For example, if the response is a read response, second AXI bridge 414 packetizes data signals received in the read response, as well as a packet header and footer, into a read complete packet. The read complete packet includes the requested read data that is received via read data channel 204 of parallel interface 420. Alternately, if the response is a write response, second AXI bridge 414 packetizes data signals received in the write response, as well as a packet header and footer, into a write response packet. The write response packet includes an indication of whether or not the write operation was completed successfully that is received via write response channel 306 of parallel interface 420. After packetizing the AXI data signals into the AXI response packet, second AXI bridge 414 transmits the AXI response packet to first AXI bridge 412 via serial link 416.

FIG. 9 illustrates an example 900 of an AXI read complete packet in accordance with one or more aspects. In this non-limiting example, AXI read complete packet 900 includes data signals captured from read data channel 204 of the AXI parallel interface, a read complete packet header, and a read complete packet footer. The read complete packet header includes a start of frame (SOF) field 902 that indicates the start of AXI read complete packet 900, and an AXI read complete packet (READ_COMPLETE) field 904 that indicates the packet is a read complete packet. AXI read complete packet 900 further includes a read identifier (RID) field 906, a first read strobe (RSTROB0) field 908, and a second read strobe (RSTROB1) field 910. First read strobe field 908 indicates the beginning of the read data and second read strobe field 910 indicates the ending of the read data.

AXI read complete packet 900 further includes a read data (RDATA) field 912 configured to hold the requested read data. Each of data fields 906-912 corresponds to data signals that are captured from read data channel 204 of the AXI parallel interface. It is to be noted that read data channel 204 would require a separate data line to communicate the data signals contained in each of data fields 906-912. In this example, AXI read complete packet 900 further includes a read complete packet footer, that includes a cyclic redundancy check field 914 that is configured to protect AXI read complete packet 900, and an end of frame (EOF) field 916 that indicates the end of AXI read complete packet 900.

FIG. 10 illustrates an example 1000 of an AXI write response packet in accordance with one or more aspects. In this non-limiting example, AXI write response packet 1000 includes data signals captured from write response channel 306 of the AXI parallel interface, a write response packet header, and a write response packet footer. The write response packet header includes a start of frame (SOF) field 1002 that indicates the start of AXI write response packet 1000, and an AXI write response packet (WRITE_RESPONSE) field 1004 that indicates the packet is a write response packet.

AXI write response packet 1000 further includes an identifier (BID) field 1006, and a write response data (BRESP) field 1008 configured to hold the write response data. Each of data fields 1006 and 1008 corresponds to data signals that are captured from write response channel 306 of the AXI parallel interface. It is to be noted that write response channel 306 would require a separate data line to communicate the data signals contained in each of these data fields. In this example, AXI write response packet 1000 further includes write response footer information, that includes a cyclic redundancy check field 1010 that is configured to protect AXI write response packet 1000, and an end of frame (EOF) field 1012 that indicates the end of AXI write response packet 1000.

In accordance with one or more aspects, after receiving the AXI response packet from second AXI bridge 414 via serial link 416, first AXI bridge 412 is configured to extract the AXI data signals corresponding to the read or write response from the AXI response packet. For example, if the AXI response packet is an AXI read response packet, first AXI bridge 412 extracts the data signals from the AXI read response packet, including the requested read data. Alternately, if the AXI response packet is an AXI write complete packet, first AXI bridge 412 extracts the data signals from the AXI write complete packet, including the indication of whether or not the write operation was completed successfully. To complete the read or write operation, first AXI bridge 412 then provides the extracted AXI data signals corresponding to the read or write response to AXI component 402 via parallel interface 418.

In accordance with one or more aspects, first AXI bridge 412 and second AXI bridge 414 are configured to implement a store and forward mode to communicate request and response data packets. In the store and forward mode, AXI bridges 412 and 414 are configured to buffer a complete request or response packet before transmitting the packet on serial link 416. The store and forward mode guarantees that only a single data packet will be transmitted in each direction on serial link 416 at any single time which eliminates flow control issues making error handling much easier.

For error handling, AXI bridges 412 and 414 are configured to issue an acknowledge command (ACK) when a data packet is received correctly, and to issue a not acknowledge command (NAK) indicating when a data packet is not received correctly. First AXI bridge 412 is configured to retransmit a request packet when a NAK single is received from second AXI bridge 414. Similarly, second AXI bridge 414 is configured to retransmit a response packet when a NAK single is received from first AXI bridge 412. In various aspects, serial interface 410 enables a read and write full duplex mode that enables packet read and write operations at the same time.

Figure 11:
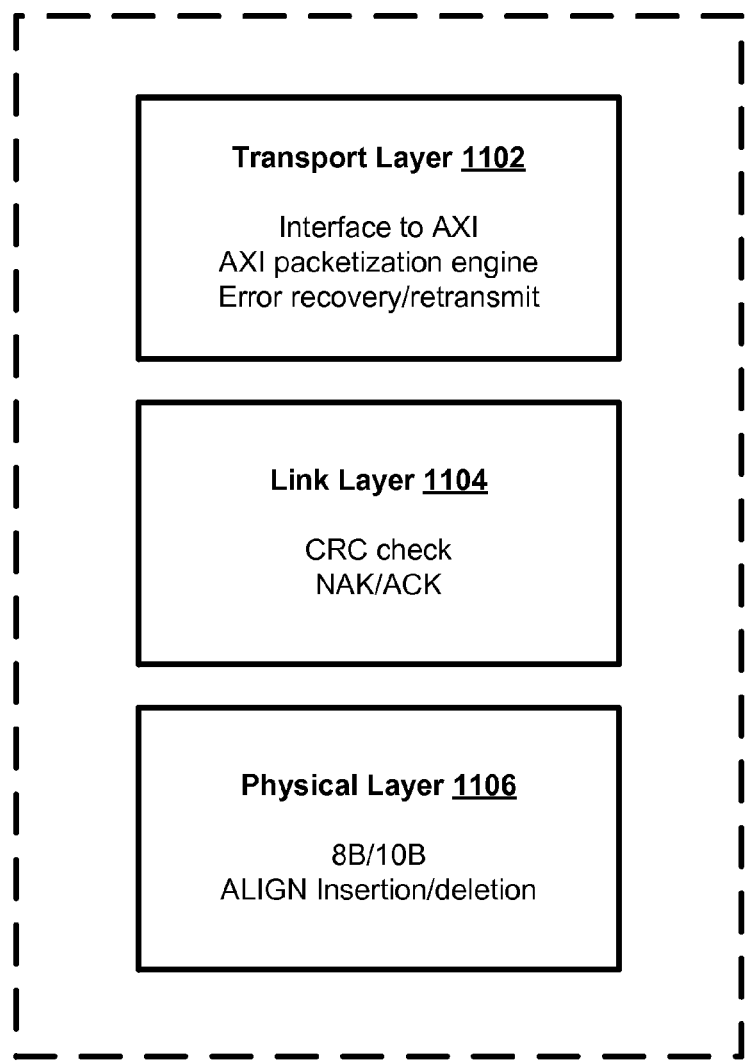
FIG. 11 illustrates an example layer stack for implementing a serial interface for FPGA prototyping.

FIG. 11 illustrates an example layer stack 1100 for implementing a serial interface for FPGA prototyping. Layer stack 1100 includes a transport layer 1102, a link layer 1104, and a physical layer 1106. Transport layer 1102 is the top layer in layer stack 1100 and implements an interface to AXI, a packetization engine for packetizing request and response packets, and the error recovery and retransmit packet. Link Layer 1104 is configured to check whether a packet is transferred successfully or not, and implements a CRC check and an ACK/NAK check. Physical layer 1106 is the bottom layer in stack 1100 and includes a coding scheme associated with serial link 8B/10B or other coding to encode the data, as well as other physical layer functions such as align insertion and deletion.

Figure 12:
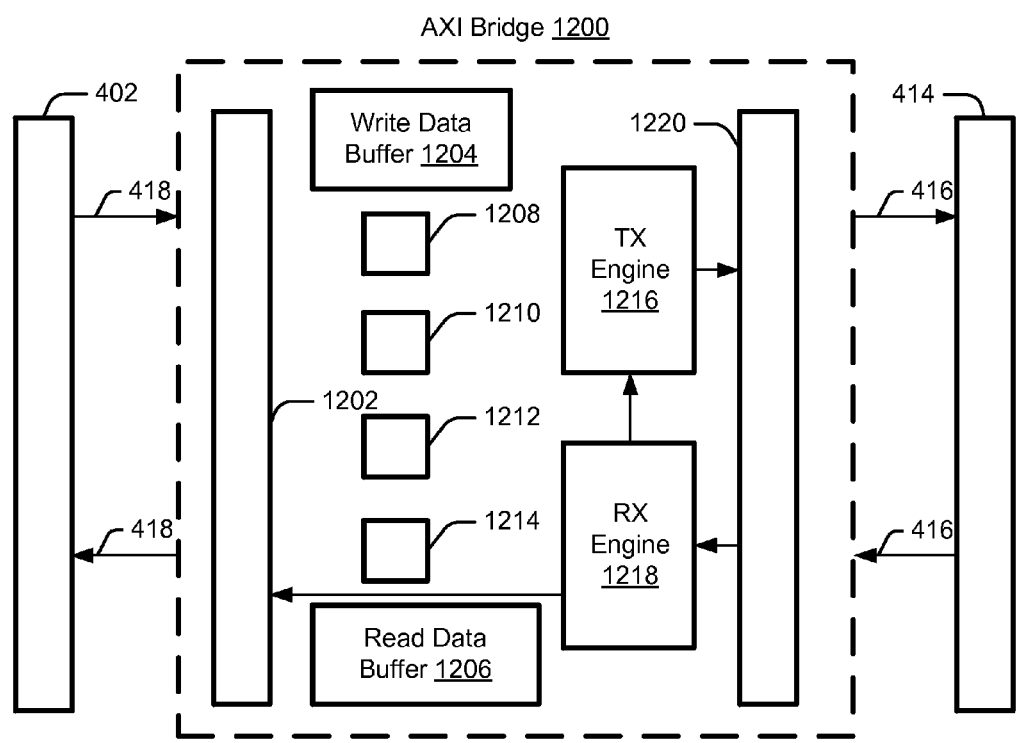
FIG. 12 illustrates an example AXI bridge in accordance with one or more aspects.

FIG. 12 illustrates an example AXI bridge 1200 in accordance with one or more aspects. It is to be noted that any of the AXI bridges illustrates in FIGS. 4, 5, and 6 may implement the components and functionality of AXI bridge 1200. In this example, AXI bridge 1200 includes a bridge 1202 that is configured to communicate with an AXI component, such as AXI component 402, via an AXI parallel interface, such as parallel interface 418. AXI bridge 1200 further includes a write data buffer 1204 for buffering write data, a read data buffer 1206 for buffering read data, a write packet header 1208, a read packet header 1210, a write response packet header 1212, and a read complete packet header 1214. AXI bridge 1200 further includes a transmit (TX) engine 1216, a receive (RX) engine 1218, and a physical layer 1220.

When the AXI component issues a data request or response, bridge 1202 receives parallel data signals corresponding to the request or response from AXI component 402 via parallel interface 418. Bridge 1202 then writes the data into write data buffer 1204 or read data buffer 1206. To create a request or response packet, TX engine 1216 packetizes the data in write data buffer 1204 or read data buffer 1206, and the packet header. For example, to create a write packet, TX engine packetizes write data from write data buffer 1204 along with write packet header 1208. Similarly, to create a read packet, TX engine packetizes read data from read data buffer 1206 along with read packet header 1210. To create a write response packet, TX engine packetizes write data from write data buffer 1204 along with write response packet header 1212. Similarly, to create a read complete packet, TX engine packetizes read data from read data buffer 1206 along with read complete packet header 1214. TX engine 1216 then sends the data packet over serial link 416 the additional AXI bridge.

When the additional AXI bridge transmits a data packet to AXI bridge 1200, physical layer 1220 receives the data packet from the additional AXI bridge via serial link 416. RX engine 1218 then extracts the data from the received data packet. For example, if a write packet is received, RX engine extracts the write data and the address to which the data is to be written. Similarly, if a read packet is received, RX engine extracts the address from which the data is to be read. If a write response packet is received, RX engine extracts the write response, and if a read complete packet is received, RX engine extracts the read data. Bridge 1202 then provides the extracted data to the AXI component as parallel data signals via parallel interface 418.

Example methods 1300 and 1400 are described with reference to FIG. 4 in accordance with one or more aspects of serial interface for FPGA prototyping. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 13:
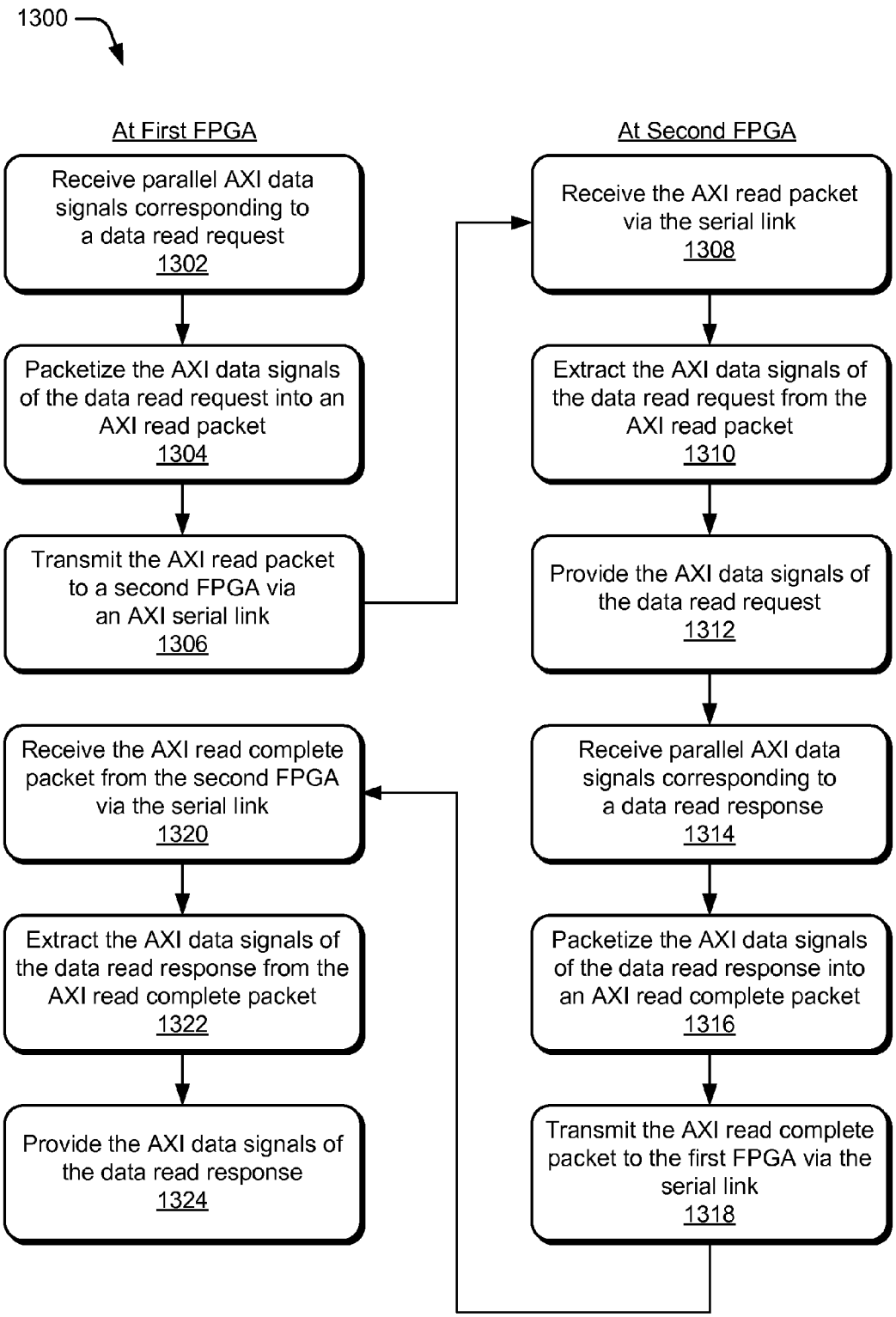
FIG. 13 illustrates example methods of performing a read operation using a serial interface for FPGA prototyping.

FIG. 13 illustrates example method(s) 1300 of performing a read operation using a serial interface for FPGA prototyping, and is described with reference to the example system-on-chip environment of FIG. 4. The order in which the method is described is not intended to be construed as a limitation, and any number of the described method operations can be combined in any order to implement the method, or an alternate method.

Method 1300 is initiated when an AXI component, such as AXI component 402, issues a data read request at a first FPGA. At 1302, parallel AXI data signals corresponding to the data read request are received. For example, first AXI bridge 412 (FIG. 4) implemented at first FPGA 404 receives parallel AXI data signals corresponding to a data read request from AXI component 402 via read address channel 202 of parallel interface 418. At 1304, the AXI data signals of the data read request are packetized into an AXI read packet. For example, first AXI bridge 412 packetizes the AXI data signals of the data read request into an AXI read packet 700 (FIG. 7). At 1306, the AXI read packet is transmitted to a second FPGA via an AXI serial link. For example, first AXI bridge 412 transmits AXI read packet 700 to second FPGA 408 via serial link 416.

At 1308, the AXI read packet is received at the second FPGA via the serial link. For example, second AXI bridge 414 at second FPGA 408 receives AXI read packet 700 via serial link 416. At 1310, the AXI data signals of the data read request are extracted from the AXI read packet. For example, second AXI bridge 414 extracts the AXI data signals of the data read request from AXI read packet 700. At 1312, the AXI data signals of the data read request are provided to an AXI switch fabric. For example, second AXI bridge 414 provides the extracted data signals of the data read request to AXI switch fabric 406 via parallel interface 420.

In response to receiving the parallel AXI data signals of the data read request, the AXI switch fabric issues a data read response that includes the requested data. At 1314, parallel AXI data signals corresponding to the data read response are received. For example, second AXI bridge 414 receives parallel AXI data signals corresponding to the data read response from AXI switch fabric 406 via read data channel 204 of parallel interface 420. At 1316, the AXI data signals of the data read response are packetized into an AXI read complete packet. For example, second AXI bridge 414 packetizes the AXI data signals of the data read response, which includes the requested data, into AXI read complete packet 900. At 1318, the AXI read complete packet is transmitted to the first FPGA via the serial link. For example, second AXI bridge 414 transmits AXI read complete packet 900 to first FPGA 404 via serial link 416.

At 1320, the AXI read complete packet is received at the first FPGA via the serial link. For example, first AXI bridge 412 at first FPGA 404 receives AXI read complete packet 900 via serial link 416. At 1322, the AXI data signals of the data read response are extracted from the AXI read complete packet. For example, first AXI bridge 412 extracts the AXI data signals of the data read response, that includes the requested read data, from AXI read complete packet 900. At 1324, the AXI data signals of the data read response, including the requested data, are provided to the AXI component. For example, first AXI bridge 412 provides the extracted data signals of the data read response to AXI component 402 via parallel interface 418 to complete the read operation.

Figure 14:
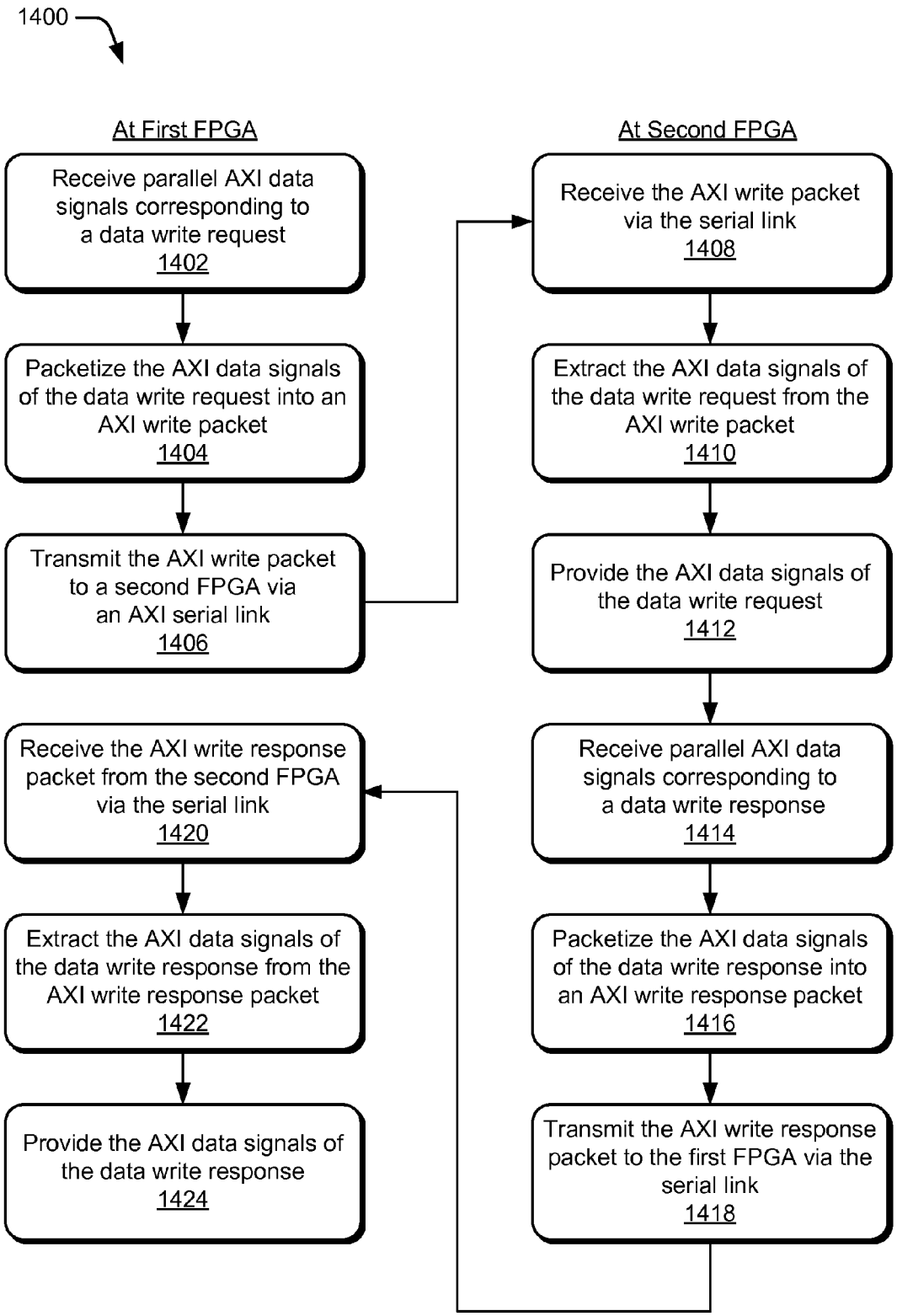
FIG. 14 illustrates example methods of performing a write operation using a serial interface for FPGA prototyping.

FIG. 14 illustrates example method(s) 1400 of performing a write operation using a serial interface for FPGA prototyping, and is described with reference to the example system-on-chip environment of FIG. 4. The order in which the method is described is not intended to be construed as a limitation, and any number of the described method operations can be combined in any order to implement the method, or an alternate method.

Method 1400 is initiated when an AXI component, such as AXI component 402, issues a data write request at a first FPGA. At 1402, parallel AXI data signals corresponding to the data write request are received. For example, AXI first bridge 412 (FIG. 4) implemented at first FPGA 404 receives parallel AXI data signals corresponding to a data write request from AXI component 402 via write address channel 302 and write data channel 304 of parallel interface 418. At 1404, the AXI data signals of the data write request are packetized into an AXI write packet. For example, first AXI bridge 412 packetizes the AXI data signals of the data write request into an AXI write packet 800 (FIG. 8). At 1406, the AXI write packet is transmitted to a second FPGA via an AXI serial link. For example, first AXI bridge 412 transmits AXI write packet 800 to second FPGA 408 via serial link 416.

At 1408, the AXI write packet is received at the second FPGA via the serial link. For example, second AXI bridge 414 at second FPGA 408 receives AXI write packet 800 via serial link 416. At 1410, the AXI data signals of the data write request are extracted from the AXI write packet. For example, second AXI bridge 414 extracts the AXI data signals of the data write request, including the write data and an identifier of the address at which to write the data, from AXI write packet 800. At 1412, the AXI data signals of the data write request are provided to an AXI switch fabric. For example, second AXI bridge 414 provides the extracted data signals of the data write request to AXI switch fabric 406 via parallel interface 420.

In response to receiving the parallel AXI data signals of the data write request, the AXI switch fabric writes the requested write data to the identified address. The AXI switch fabric then issues a data write response that includes an indication of whether or not the write operation was successful. At 1414, parallel AXI data signals corresponding to the data write response are received. For example, second AXI bridge 414 receives parallel AXI data signals corresponding to the data write response from AXI switch fabric 406 via write response channel 306 of parallel interface 420. At 1416, the AXI data signals of the data write response are packetized into an AXI write response packet. For example, second AXI bridge 414 packetizes the AXI data signals of the data write response, which includes the indication of whether or not the write operation was successful, into AXI write response packet 1000 (FIG. 10). At 1418, the AXI write response packet is transmitted to the first FPGA via the serial link. For example, second AXI bridge 414 transmits AXI write response packet 1000 to first FPGA 404 via serial link 416.

At 1420, the AXI write response packet is received at the first FPGA via the serial link. For example, first AXI bridge 412 at first FPGA 404 receives AXI write response packet 1000 via serial link 416. At 1422, the AXI data signals of the data write response are extracted from the AXI write response packet. For example, first AXI bridge 412 extracts the AXI data signals of the data write response, that includes the indication of whether or not the write operation was successful, from AXI write response packet 1000. At 1424, the AXI data signals of the data write response, including the indication of whether or not the data write operation was successful, are provided to the AXI component. For example, first AXI bridge 412 provides the extracted data signals of the data write response to AXI component 402 via parallel interface 418 to complete the write operation.

Figure 15:
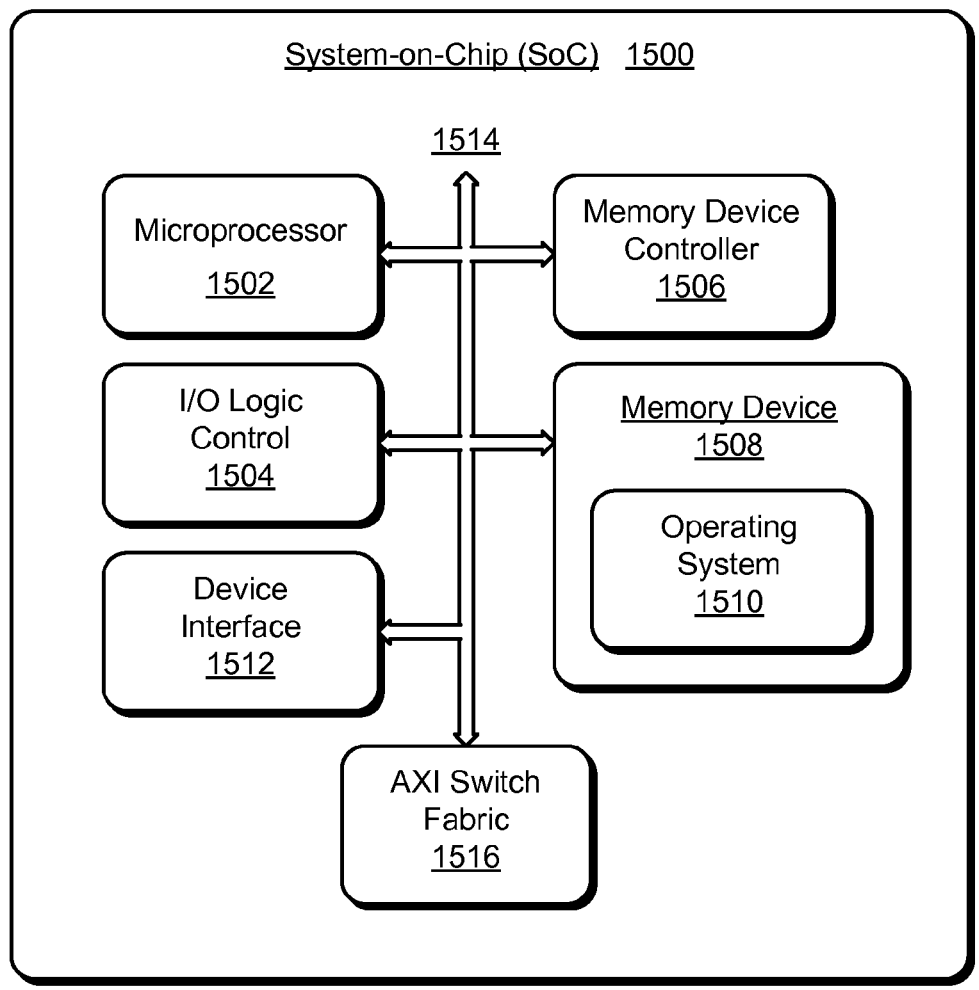
FIG. 15 illustrates an example system-on-chip which can be implemented using various aspects of serial interface for FPGA prototyping.

FIG. 15 illustrates an example system-on-chip (SoC) 1500, which can be implemented using various aspects of serial interface for FPGA prototyping as described herein. The SoC may be implemented in any type of device, such as the devices described below with reference to FIG. 16. SoC 1500 can be integrated with electronic circuitry, a microprocessor, memory, input-output (I/O) logic control, communication interfaces and components, as well as other hardware, firmware, and/or software.

In this example, the SoC 1500 is integrated with a microprocessor 1502 (e.g., any of a microcontroller or digital signal processor) and input-output (I/O) logic control 1504 (e.g., to include electronic circuitry). The SoC 1500 includes a memory device controller 1506 and a memory device 1508, such as any type of a nonvolatile memory and/or other suitable electronic data storage device. The SoC can also include various firmware and/or software, such as an operating system 1510 that is maintained by the memory and executed by the microprocessor.

SoC 1500 includes a device interface 1512 to interface with a device or other peripheral component. The SoC 1500 also includes an integrated data bus 1514 that couples various components of the SoC for data communication between the components, as well as with an AXI switch fabric 1516. As described herein, integrated data bus 1514 can include a serial interface for FPGA prototyping. As described above, the serial interface enables communication of data request and response packets between FPGA components and an AXI switch fabric 1516. The data bus in the SoC may also be implemented as any one or a combination of different bus structures and/or bus architectures.

Figure 16:
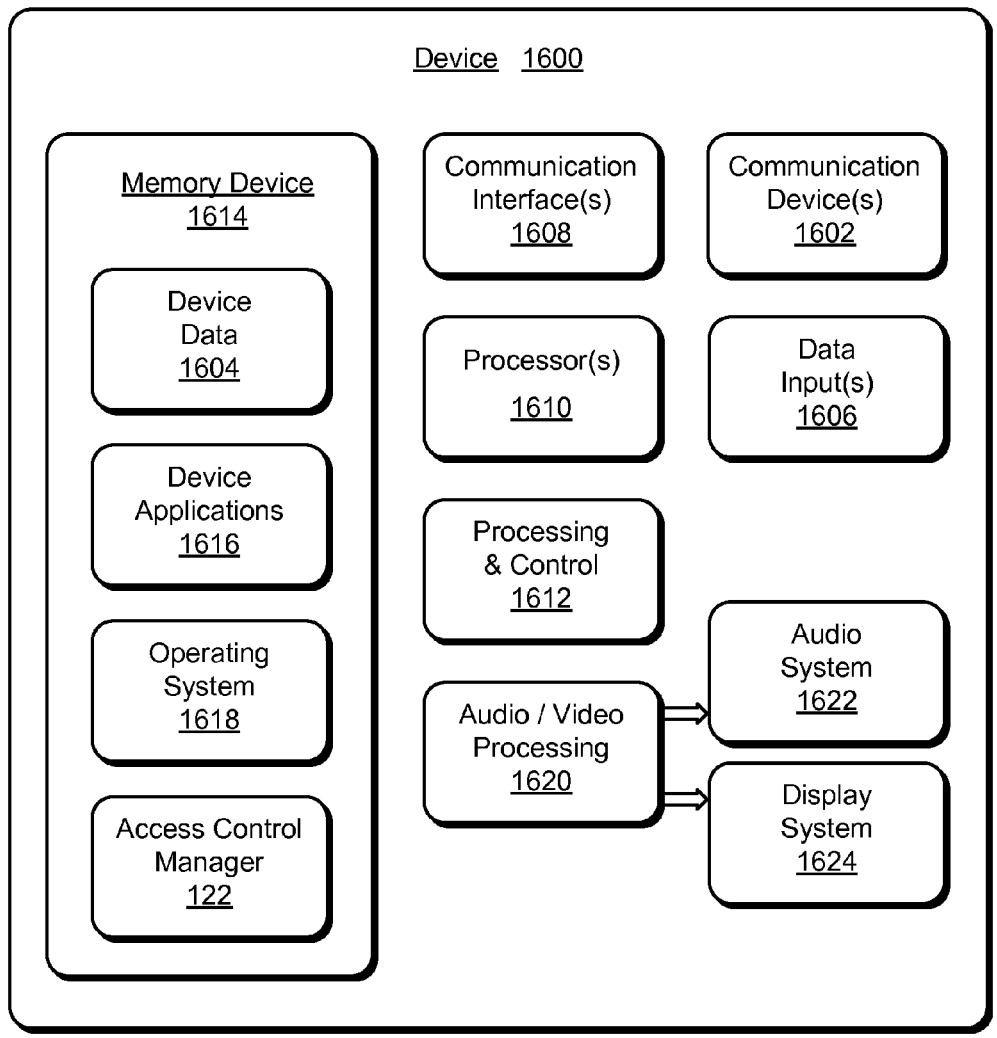
FIG. 16 illustrates various components of an example device that may be implemented to include various aspects of serial interface for FPGA prototyping.

FIG. 16 illustrates various components of an example device 1600 that may be implemented to include various aspects of serial interface for FPGA prototyping. The device may be associated with a user (i.e., a person) and/or an entity that operates the device such that a device describes logical devices that include users, software, firmware, hardware, and/or a combination of devices.

Device 1600 includes communication devices 1602 that enable wired and/or wireless communication of device data 1604, such as received data, data that is communicated between devices, data packets of the data, etc. Device 1600 also includes one or more data inputs 1606 via which any type of data, media content, and/or inputs can be received, such as user-selectable inputs and any other type of audio, video, and/or image data received from any content and/or data source. The data inputs 1606 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

Device 1600 also includes communication interfaces 1608, such as any one or more of a serial, parallel, network, or wireless interface. The communication interfaces provide a connection and/or communication links between the device and a network by which other electronic, computing, and communication devices communicate data with the device. Although not shown, the device can include a system bus or data transfer system that couples the various components within the device. A system bus can include any one or combination of different bus structures, such as an AXI serial interface, a memory bus or memory controller, a peripheral bus, a universal serial bus, and/or a processor or local bus that utilizes any of a variety of bus architectures.

Device 1600 includes one or more processors 1610 (e.g., any of microprocessors, controllers, and the like), or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 1612.

The device 600 also includes one or more memory devices 1614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 1614 provides data storage mechanisms to store the device data 1604, other types of information and/or data, and device applications 1616. For example, an operating system 1618 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications 1616 also include a transport layer 1102, a link layer 1104, and a physical layer 1106. The device applications 1616 may be implemented in the general context of software, firmware, hardware (e.g., fixed logic circuitry), or any combination thereof.

Device 1600 may also include an audio and/or video processing system 1620 that generates audio data for an audio system 1622 and/or generates display data for a display system 1624. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although aspects of serial interface for FPGA prototyping have been described in language specific to features and/or methods, the subject of the appended claims is not necessarily limited to the specific features or methods described. Rather the specific features and methods are disclosed as example implementations of serial interface for FPGA prototyping.

What is claimed is:

1. A serial interface for field programmable gate array (FPGA) prototyping comprising:
    a first advanced crossbar interconnect (AXI) bridge at a first FPGA, the first AXI bridge configured to receive AXI data signals of a read or write request from a first AXI component via a first AXI parallel interface, packetize the AXI data signals into an AXI request packet, and transmit the AXI request packet to a second FPGA via a serial link, the AXI request packet including an address associated with the read or write request; and
    a second AXI bridge at the second FPGA, the second AXI bridge configured to receive the AXI request packet via the serial link, extract the AXI data signals of the read or write request from the AXI request packet, and provide the AXI data signals of the read or write request to a second AXI component via a second AXI parallel interface.

2. The serial interface as recited in claim 1, wherein the first AXI component comprises an AXI master and the first AXI bridge comprises an AXI master bridge, and wherein the second AXI component comprises an AXI switch fabric and the second bridge comprises an AXI slave bridge.

3. The serial interface as recited in claim 1, wherein the first AXI component comprises an AXI slave and the first AXI bridge comprises an AXI slave bridge, and wherein the second AXI component comprises an AXI switch fabric and the second AXI bridge comprises an AXI master bridge.

4. The serial interface as recited in claim 1, wherein the first AXI bridge is configured to packetize the AXI data signals into an AXI read packet when the AXI data signals correspond to the read request, and wherein the address indicates the address from which data is to be read.

5. The serial interface as recited in claim 4, wherein the AXI data signals of the read request are received by the first AXI bridge via a read address channel of the first AXI parallel interface.

6. The serial interface as recited in claim 1, wherein the first AXI bridge is configured to packetize the AXI data signals into an AXI write packet when the AXI data signals correspond to the write request, and wherein the AXI write packet includes write data, and wherein the address identifies the address at which the write data is to be written.

7. The serial interface as recited in claim 6, wherein the AXI data signals of the write request are received by the first AXI bridge via a write address channel and a write data channel of the first AXI parallel interface.

8. The serial interface as recited in claim 1, wherein:
    the second AXI bridge is further configured to receive additional AXI data signals of a read or write response from the second AXI component via the second AXI parallel interface, packetize the additional AXI data signals into an AXI response packet, and transmit the AXI response packet to the first FPGA via the serial link; and
    the first AXI bridge is further configured to receive the AXI response packet via the serial link, extract the additional AXI data signals of the read or write response from the AXI response packet, and provide the additional AXI data signals of the read or write response to the second AXI component via the first AXI parallel interface.

9. The serial interface as recited in claim 8, wherein the second AXI bridge is configured to packetize the additional AXI data signals into an AXI read complete packet when the additional AXI data signals correspond to the read response, and wherein the read complete packet includes data identified in the request.

10. The serial interface as recited in claim 9, wherein the additional AXI data signals of the read response are received by the second AXI bridge via a read data channel of the second AXI parallel interface.

11. The serial interface as recited in claim 8, wherein the second AXI bridge is configured to packetize the additional AXI data signals into an AXI write response packet when the AXI data signals correspond to the write response, and wherein the write response packet includes an indication of whether or not a data write operation was successful.

12. The serial interface as recited in claim 11, wherein the additional AXI data signals of the write response are received by the second AXI bridge via a write response channel of the second AXI parallel interface.

13. The serial interface as recited in claim 1, wherein the first bridge and the second bridge are configured to transmit data packets via the serial link one packet at a time.

14. The serial interface as recited in claim 1, wherein the first bridge and the second bridge are configured to issue an acknowledge command when a data packet is received correctly via the serial link, and issue a not acknowledge command when the data packet is not received correctly.

15. The serial interface as recited in claim 13, wherein the serial interface enables a read and write full duplex mode.

16. A method comprising:
    receiving, at a first advanced crossbar interconnect (AXI) bridge of a first FPGA, AXI data signals of a read or write request from a first AXI component via a first AXI parallel interface;
    packetizing the AXI data signals into an AXI request packet;
    transmitting the AXI request packet to a second FPGA via a serial link, the AXI request packet including an address associated with the read or write request;
    receiving, at a second AXI bridge of the second FPGA, the AXI request packet via the serial link;
    extracting the AXI data signals of the read or write request from the AXI request packet; and
    providing the AXI data signals of the read or write request to a second AXI component via a second AXI parallel interface.

17. The method as recited in claim 16, wherein the first AXI component comprises an AXI master and the first AXI bridge comprises an AXI master bridge, and wherein the second AXI component comprises an AXI switch fabric and the second bridge comprises an AXI slave bridge.

18. The method as recited in claim 16, wherein the first AXI component comprises an AXI slave and the first AXI bridge comprises an AXI slave bridge, and wherein the second AXI component comprises an AXI switch fabric and the second AXI bridge comprises an AXI master bridge.

19. The method as recited in claim 16, wherein the AXI request packet comprises:
    an AXI read packet when the AXI data signals correspond to the read request, and wherein the address indicates the address from which data is to be read; or
    an AXI write packet when the AXI data signals correspond to the write request, and wherein the AXI write packet includes write data, and wherein the address identifies the address at which the write data is to be written.

20. A system comprising:
    a first FPGA;
    a second FPGA;
    a first advanced crossbar interconnect (AXI) bridge at the first FPGA, the first AXI bridge configured to receive AXI data signals of a read or write request from a first AXI component via a first AXI parallel interface, packetize the AXI data signals into an AXI request packet, and transmit the AXI request packet to the second FPGA via a serial link, the AXI request packet including an address associated with the read or write request; and
    a second AXI bridge at the second FPGA, the second AXI bridge configured to receive the AXI request packet via the serial link, extract the AXI data signals of the read or write request from the AXI request packet, and provide the AXI data signals of the read or write request to a second AXI component via a second AXI parallel interface.

* * * * *